(12) United States Patent
Chaudhari et al.

(10) Patent No.: US 7,831,424 B2
(45) Date of Patent: Nov. 9, 2010

(54) TARGET SPECIFIC DATA FILTER TO SPEED PROCESSING

(75) Inventors: Upendra V. Chaudhari, Briarcliff Manor, NY (US); Juan M. Huerta, Bronx, NY (US); Ganesh N. Ramaswamy, Mohegan Lake, NY (US); Olivier Verscheure, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 12/060,903

(22) Filed: Apr. 2, 2008

(65) Prior Publication Data

US 2009/0043579 A1 Feb. 12, 2009

Related U.S. Application Data

(63) Continuation of application No. 11/482,408, filed on Jul. 7, 2006, now abandoned.

(51) Int. Cl.
*G10L 17/00* (2006.01)
*G10L 21/00* (2006.01)
(52) U.S. Cl. .................. 704/247; 704/246; 704/270
(58) Field of Classification Search .................. None
See application file for complete search history.

(56) References Cited

U.S. PATENT DOCUMENTS

| | | | |
|---|---|---|---|
| 4,955,056 A | | 9/1990 | Stentiford |
| 5,461,697 A | | 10/1995 | Nishimura et al. |
| 5,684,925 A | * | 11/1997 | Morin et al. ............. 704/254 |
| 6,256,609 B1 | | 7/2001 | Byrnes et al. |
| 6,665,644 B1 | * | 12/2003 | Kanevsky et al. ........... 704/275 |
| 7,475,016 B2 | * | 1/2009 | Smith et al. ................. 704/258 |
| 7,529,669 B2 | * | 5/2009 | Ravi et al. ................... 704/249 |
| 2002/0198711 A1 | | 12/2002 | Brandman |
| 2003/0055642 A1 | * | 3/2003 | Harada ....................... 704/246 |
| 2003/0198195 A1 | | 10/2003 | Li |

FOREIGN PATENT DOCUMENTS

JP 02250099 10/1990

(Continued)

OTHER PUBLICATIONS

Dossier DE919990056: "Method and System for Generating Squeezed Acoustic Models for Specialized Speech Recognizer".

(Continued)

*Primary Examiner*—Brian L Albertalli
(74) *Attorney, Agent, or Firm*—Scully, Scott, Murphy & Presser, P.C.; Anne Dougherty, Esq.

(57) ABSTRACT

A method is presented which reduces data flow and thereby increases processing capacity while preserving a high level of accuracy in a distributed speech processing environment for speaker detection. The method and system of the present invention includes filtering out data based on a target speaker specific subset of labels using data filters. The method preserves accuracy and passes only a fraction of the data by optimizing target specific performance measures. Therefore, a high level of speaker recognition accuracy is maintained while utilizing existing processing capabilities.

8 Claims, 3 Drawing Sheets

FOREIGN PATENT DOCUMENTS

| | | |
|---|---|---|
| JP | 698319 | 8/1994 |
| JP | 10097274 | 4/1998 |
| JP | 11150713 | 6/1999 |
| WO | 2005083706 | 7/2005 |

OTHER PUBLICATIONS

Dossier YOR919970234: "Systems and Methods for Access Filtering Employing Relaxed Recognition Constraints".

Dossier YOR920000199: "Format Tracking via Adaptive Filtering and its use in Speech Recognition".

English-language Abstract of Japanese Publication No. 04-163600, dated Jun. 9, 1992.

\* cited by examiner

TARGET SPECIFIC DATA FILTER TO SPEED PROCESSING

CROSS-REFERENCE TO RELATED APPLICATION

This application is a continuation of U.S. patent application Ser. No. 11/482,408, filed on Jul. 7, 2006, entitled "TARGET SPECIFIC DATA FILTER TO SPEED PROCESSING", which is hereby incorporated by reference in its entirety.

This invention was made with Government support under Contract No. H98230-04-C-0920 awarded by the National Security Agency. The Government has certain rights in this invention.

FIELD OF THE INVENTION

The invention relates to a contemporary speech analysis method and system, and more particularly, to a speech analysis method and system which filters out data using a data filter based on a target speaker specific subset of labels.

BACKGROUND OF THE INVENTION

Contemporary speech analysis systems operate over a range of operating points, each with a characteristic resource usage, accuracy, and throughput. It would therefore be desirable for a speech analysis method to address the problem of increasing throughput while minimizing the impact on accuracy while maintaining or reducing the resource usage for a speech based detection task, in particular, speaker recognition. It would further be desirable for a speech analysis method to extract time-critical information from large volumes of unstructured data while filtering out unimportant data that might otherwise overwhelm the available resources.

SUMMARY OF THE INVENTION

The invention relates to a method and system for reducing the amount of speech data for detecting desired speakers which comprises providing a plurality of speech data from a plurality of speakers. The speech data is reduced using a speaker dependent filter which employs a label priority ranking of the labeled speech data for each of the speakers. The labeled speech data is prioritized according to a performance criterion for each of the plurality of speakers. Then, the labeled speech data is analyzed according to the priority rank of the label of the speech data for a specific speaker, wherein specified lower priority labeled speech data is dropped or filtered out such that less speech data is analyzed.

In a related aspect of the invention, the speakers are divided into groups of speakers and the filters are generated and used for each group of speakers. The data may also be pre-labeled.

In a related aspect of the invention, the labeled groups of speakers are priority ranked.

In another aspect of the invention a speaker recognition system using a computer comprises a plurality of speech data from a plurality of speakers stored on a computer. A labeler element analyzes the speech data and labels the data. A speech data filter includes a filter element for arranging the labels in a priority rank and designed according to a performance criterion for each of the plurality of speakers. A recognition element analyzes the labeled data in accordance with the priority rank as determined by the speech data filter.

In a related aspect of the invention the labels are phonetic.

DETAILED DESCRIPTION OF THE INVENTION

The present invention provides for data filtering in the context of a distributed speech processing architecture designed to detect or identify speakers where the design of the filter depends on the ability to recognize the specific desired speaker, or group of speakers. According to the present invention, a target specific data filter method and system is provided which allows a large percentage of data to be ignored while preserving substantial accuracy. Filtering can refer to selecting data, as well as, excluding data.

The target specific data filter method and system of the present invention applies data filtering to provide the advantage of increasing throughput while minimizing the impact on accuracy. The filters are optimized for the detection of a specific target. This reduction of data by filtering allows for example, more audio data to be concurrently processed. An advantage of the present invention is, for example, more data can be processed in a fixed amount of time without an increase in resources, resulting in an increase in processing capacity.

The architecture that is presented consists of a feature extraction component, a feature labeling/and or filtering component which can reduce the data, and a speaker detection component. The recognition task itself encompasses two subtasks, that of identification and verification (detection). Thus, target models are associated with an optimal set of labels with respect to recognition performance or another performance measure. In cases where the identity of the speaker sought is known, the data in the system can be filtered to pass only the optimal labels for that speaker. Alternatively, if there is a set of speakers of interest, for example, the enrolled population, then an aggregate best list of labels can be chosen.

The nature of the labels, e.g. the characteristics of the alphabet, will determine the granularity with which the data can be filtered to achieve various operating points on a performance vs. complexity curve. Phonetic labels may be used to show that testing based on the filtered data preserves accuracy.

The present invention addresses the task of filtering out data to increase the throughput (processing capacity) while minimizing the impact on accuracy and maintaining or reducing the resource usage for a speech based detection task, in particular, speaker recognition. Filtering in this context means selectively dropping data. The result of this approach improves the capability to analyze higher volumes of data with a limited set of resources which can remain constant.

Figure 1:
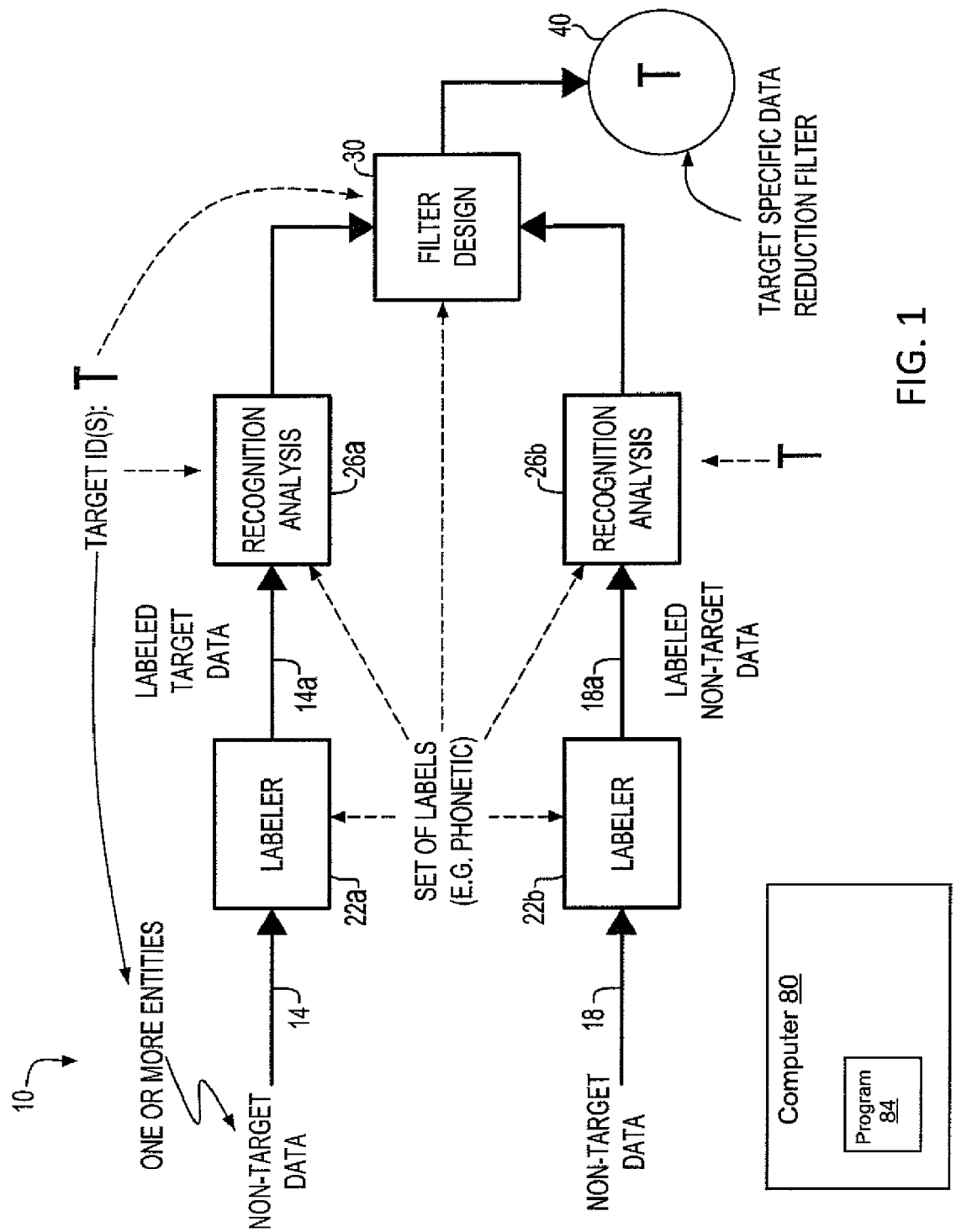
FIG. 1 is a block diagram of an exemplary data reduction filter design.

According to the present invention, when a large amount of data is held it can be either labeled or unlabeled. Referring to FIG. 1, if the data 14, 18 is unlabeled, then the data 14, 18 is passed through a labeler. The labeled data 14a, 18a has to be analyzed, however, a problem arises when some systems do not have the resources to analyze the kind of data or quantity of data. The target specific data reduction filter 40 is used to select the part of the data to analyze. Thus, only part of the data, (the filter 40 has filtered out the rest of that data) will be analyzed by the recognition analysis component 26c, as shown in FIG. 3.

According to the present invention, speaker recognition can be realized as computationally isolated algorithmic components arranged in an analysis pipeline, wherein a sequence of speech frames, each processed individually, constitute the data stream flowing through the pipeline. These components can be used for multiple tasks. For example, when the input is compressed audio data, the various components might include audio waveform decompression, speech feature extraction, intermediate feature processing, and speaker detection. Any component can act as a data filter for downstream components, eliminating their computation time for the filtered frame. In order to obtain the desired results quality filters are applied. A methodology is developed to determine effective, high quality, filters based on the special properties of the recognition task. The phonetic labels are associated with each data frame, but the technique could apply generally.

Figure 2:
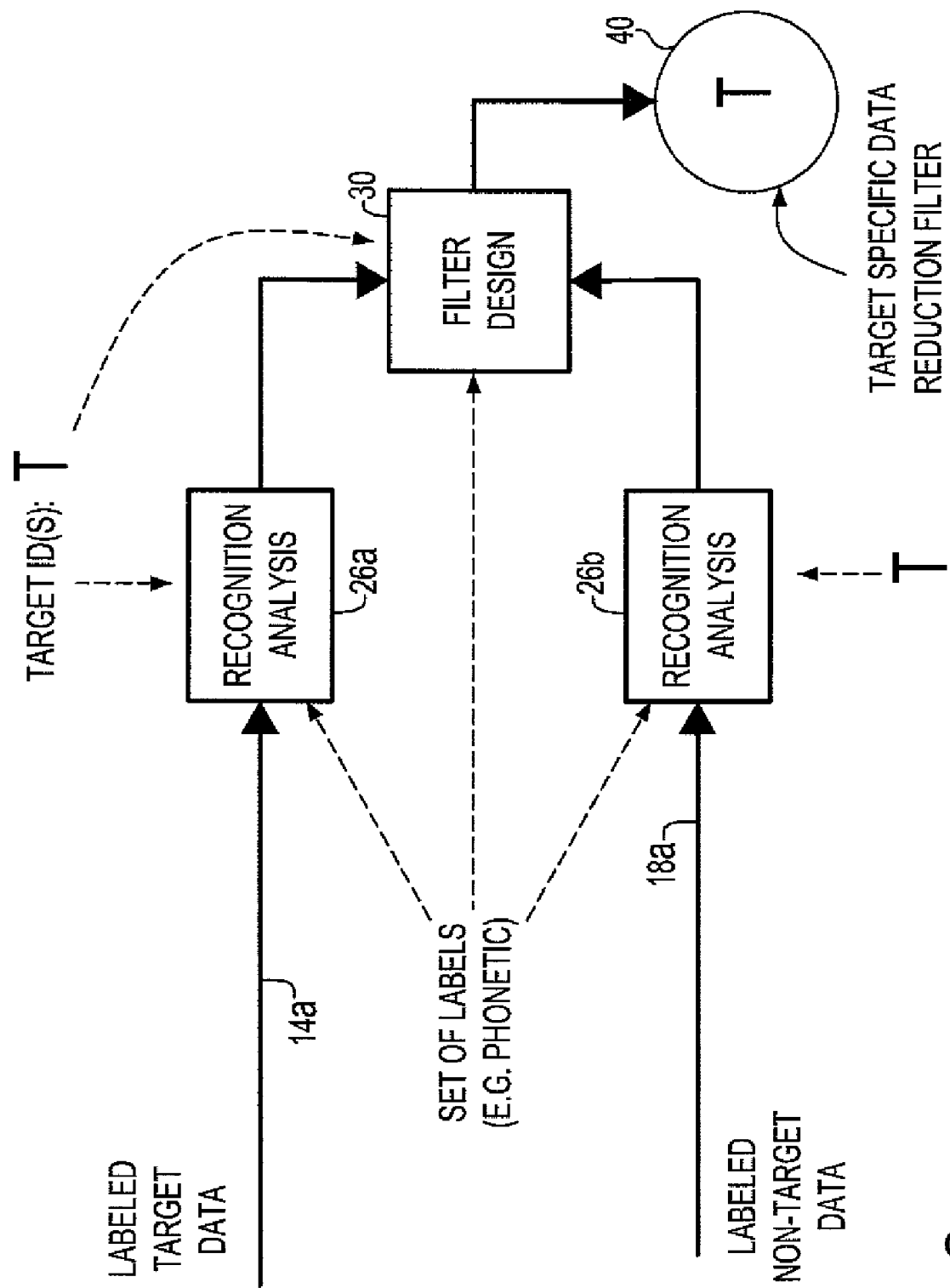
FIG. 2 is a block diagram of the data reduction filter design of FIG. 1 wherein the target and non-target data is previously labeled.

According to the present invention, data is filtered (i.e. passing or dropping) data in a speaker or target specific manner to increase processing capacity in a distributed framework while trying to maintain accuracy. There are two different phases of the method/system according to the present invention, first creating the filter, i.e., the design of the target specific data filtered (as shown in FIGS. 1 and 2), and then using the designed filter to filter the labeled target data (as shown in FIG. 3). To design the filter, the data is analyzed such that the data is essentially a sequence of vectors coming one after the other in time. Thus, the data can be thought of as a sequence of feature vectors (data) one after the other in time. Each feature vector (data) has a label associated with it, which for example, may be a phonetic label, thus the data is labeled. The analysis includes the labeled data from a particular target, the recognition performance is based on each of the labels, as well as, based on using combined subscripts of these labels.

Figure 3:
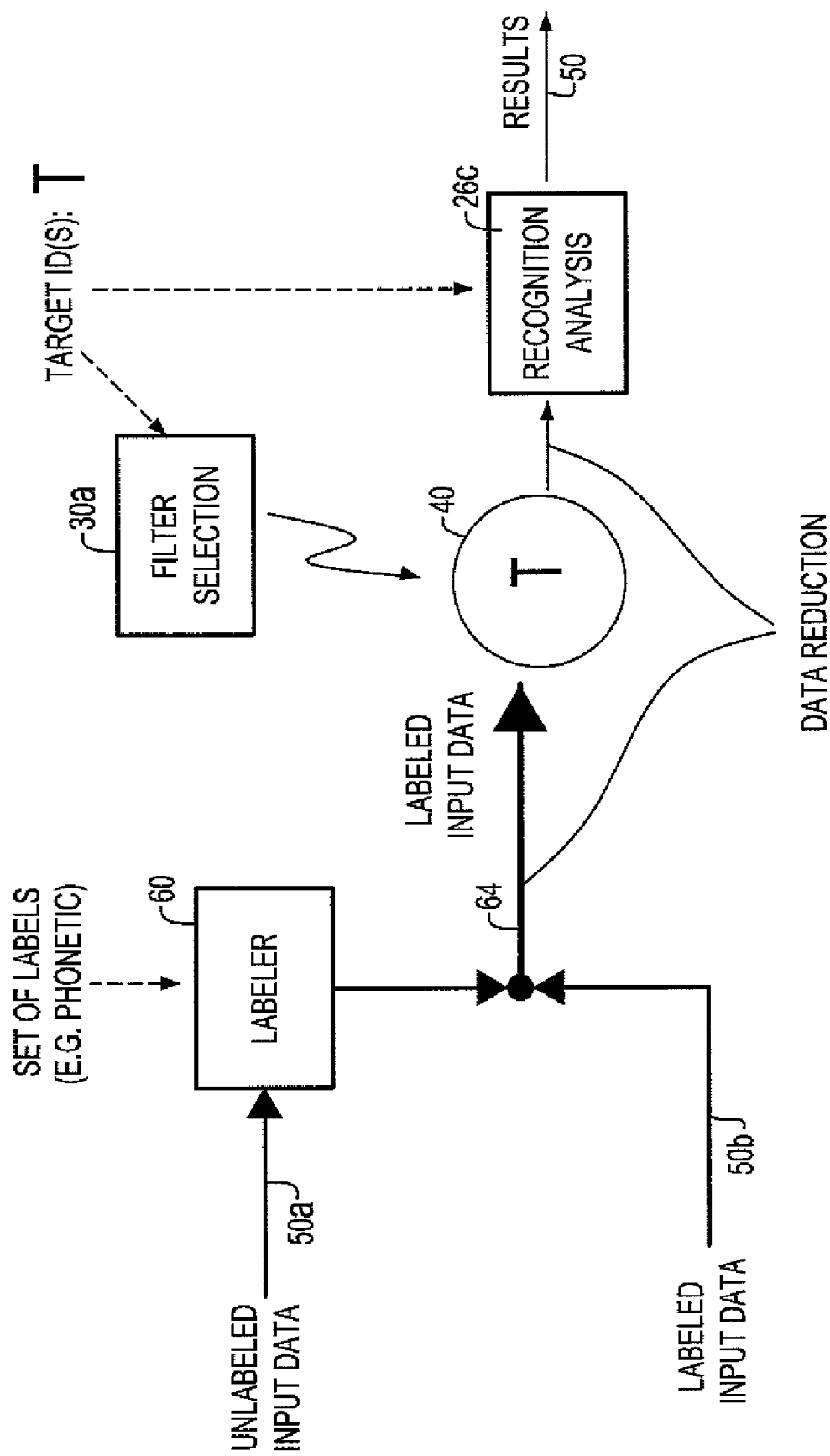
FIG. 3 is a block diagram depicting the use of the data reduction filter shown in FIGS. 1 and 2.

Referring to FIG. 3, the labeled input data 64 is filtered corresponding to the set of labels that perform the best and inputted into the recognition analysis program 26c. Thus, the target specific data reduction filter 40 is designed in a first phase, as shown in FIGS. 1 and 2, and implemented and used in a second phase, shown in FIG. 3. The data used to design the filter 40, in FIGS. 1 and 2, may be different than the data which is actually filtered, in FIG. 3, at least in quantity.

Referring to FIG. 1, the target specific data filter method and system 10 includes data to be analyzed comprising target data 14 and non-target data 18. Both the target data 14 and non-target data 18 are unlabeled. The system 10 includes target data 14 and non-target data 18 both entering labelers 22a and 22b, respectively. The labelers apply, for example, phonetic labels, to the target data and non-target data. Other labeling systems may also be used, for example, a set of labels corresponding to a set of clusters (feature vectors that naturally group together) derived in some manner from development data. The speech data may include a group of speaker or one speaker (or any subset of speakers). When the speech data is targeted, the speech data from the specified speaker (or speakers) is labeled 22a. Other speech, not from the targeted individuals, is labeled in 22b and provided as non target data. The speech data is labeled for each data vector 14, 18 by a labeler 22a, 22b, resulting in labeled data 14a and 18a as an output from the labelers 22a, and 22b, respectively.

Non-target data 18 is data from the speaker or speakers that are not being targeted. The filter 40 is created to seek out one specific entity (speaker), and the target data is data from that entity/speaker. Both the target data 14 and non-target 18 data go through the labelers 22a and 22b, respectively, and are labeled with a set of phonetic units, or a set of labels, or any recognizable label. The data, as a sequence of feature vectors has a label associated with it for a particular target. The recognition performance based on each of the labels as well as based on using combined subscripts of these labels can be ascertained. The labelers 22a and 22b may use any means to label the data, for example, a computer program. The data could be labeled with any label that will provide the same function, such as label 1, label 2, label 3. In general, the data could be labeled based on any set of labels, provided that each feature vector of the data belongs to at least one label.

Once the data is labeled, a recognition analysis 26a and 26b is provided for each individual label and for each of groups of labels, as shown in FIG. 1. The recognition analysis 26a and 26b is the process of prioritizing the labels in order of accuracy, and/or may include other performance measures. A performance analysis is done for each label to show which label is most effective in retaining information for detecting the target from the data. For example, consider the set of phonetic labels. Looking in turn at data corresponding to each label, it may turn out that speaker A is best detected using the data labeled "iy". On the other hand speaker B might best be detected using data corresponding to the "ow" label, etc. Thus, each possible label is evaluated for performance and the best label can be chosen. Non target data is used to test the robustness of the data reduction filter and can be incorporated in a performance measure.

The labels are prioritized for filtering the data using a performance criterion that uses for example the accuracy of detection and/or the amount of data reduced. An individual label for data can be evaluated or a group of labels can be evaluated as a group for filtering data. For example, a group of two labels might correspond to less data than a third other label, and performance with respect to that data may be better than that with respect to the data from the third label.

FIG. 2 shows the creation of a target specific data reduction filter 40 where the data 14a, 18a is already labeled by another source. All the labeled data 14a and 18a is inputted in the recognition analysis 26a and 26b and generates the filter 40 based on the filter design 30. Again, the recognition analysis 26a and 26b is the process of prioritizing the labels in order of accuracy. For example, the best label may be a single label, and the second best label may be a combination of labels or group of labels, as explained above.

As discussed above, different labels may be better for different target data. For example, to detect the presence of a first speaker in a group of data the recognition analysis method may look at the "A" sound because for that speaker the best detection occurs when targeting the sound of "A", and for a second speaker, the "E" sound may result in better detection.

Once the best label or group of labels is determined, the filter design can be characterized, for example, as a rank list of label sets according to their performance. A large amount of data can be reduced by filtering the data using the filter design 30 developed by the recognition analysis 26a.

An example embodiment of using the filter 40 according to the present invention is shown in FIG. 3. The resulting filtered data is much smaller than the original large data group and can be analyzed for recognition analysis 26c expending much less resources, for example, computer processing requirements and storage capacity while maintaining a high level of accuracy as demonstrated in the experimental results.

The system and method of the present invention produces a ranked list of target specific labels (or label sets). The data reduction results from only keeping data corresponding to the top number (N) of labels (or sets), where N depends on the resource availability.

Thus, data can be either unlabeled and receive a label after going through the labeler 22a, 22b (as shown in FIG. 1), or the data can be pre-labeled data (as shown in FIG. 2). Each speaker receives his own rank system of labels. The method provides using filters which include a ranking list for the performance of the labels. The labels are used to reduce a large quantity of data by either choosing data having a specified label, and/or ignoring data not having the specified label (or labels). Thus, the amount of data for analysis is reduced. As shown in FIG. 3, labeled input data 64 is filtered using the target data reduction filter 40 before the recognition analysis 26c. The quantity of data is greatly reduced before the recognition analysis 26c. The recognition analysis step 26c is then able to take much less time and resources to produce speaker recognition results 50.

The components of the speaker recognition system 10 may utilize a computer 80 and computer program 84. The target data 14, and non-target data 18 may be stored on a single or computer or multiple computers. The labelers 22a, 22b, recognition analysis program 26a, 26b, and filter design 30 and target specific data reduction filter 40 may all be stored on a computer or distributed on multiple computers and use computer programs to implement their respective functions.

Recognition Model

One embodiment according to the present invention uses a state of the art speaker recognition system, where modeling is based on transformation enhanced models in the GMM-UBM (Gaussian Mixture Model-Universal Background Model) framework. Data is represented as a sequence of vectors $\{x_j\}$, where i=1, 2, 3, ..., and each element corresponds to an observed data frame. The UBM Model $M_{UBM}$ is parameterized by $$\{m_i^{UBM}, \Sigma_i^{UBM}, p_i^{UBM}\}_{i=1,\ldots,N^{UBM}} \text{ and } T^{UBM},$$

consisting of the estimates of the mean, diagonal covariance, and mixture weight parameters for each of the $N^{UBM}$ Gaussian components in the transformed space specified by an MLLT transformation, $T^{UBM}$, which is chosen to give the optimal space for restriction to diagonal covariance models. That is represented by the equation:

$$m_i^{UBM} = T^{UBM} m_i^{UBM,o} \text{ and } \Sigma_i^{UBM} = \text{diag}(T^{UBM} \Sigma_i^{UBM,o} T^{UBM,T})$$

The "o" in the superscript indicates parameters derived from the original untransformed data through Expectation Maximization (EM) iterations. The "T" stands for transpose. EM is a standard technique to update the parameters of a model. After EM, $T^{UBM}$ is estimated based on the resultant parameters and is subsequently applied to them to construct the final model. This UBM model represents the background population and is trained with data from a large number of speakers so as to create a model without idiosyncratic characteristics. Based on this reference, each speaker $M_j$, is parameterized by:

$$\{m_i^j, \Sigma_i^j, p_i^j\}_{i=1,\ldots,N^{UBM}}$$

The speaker dependent MLLT, $T^j$, is identical to $T^{UBM}$, whereas more generally it could be different. These parameters are derived via Maximum A Posteriori Probability (MAP) adaptation, a standard technique for parameter update, from the UBM parameters in the transformed space, based on speaker specific training data. The number of Gaussian components is the same as that for the UBM. Thus, the observed speaker training data $\{x_i\}$ is transformed into the new space $\{T^{UBM} x_i\}$ before the MAP adaptation.

Discriminants

To evaluate a speaker model with respect to test data we use a likelihood ratio based discriminant function that takes into account the added feature transformation. Given a set of vectors $X=\{x_t\}$, t=1 ... $N_{test}$, in $R^n$, the frame based discriminant function for any individual target model $M_j$ is (equation no. 1).

$$d(x_t \mid M^j) = \log p(T^{UBM} x_t \mid m_{i*}^j, \Sigma_{i*}^j, p_{i*}^j) - \max_i [\log p(T^{UBM} x_t \mid m_i^{UBM}, \Sigma_i^{UBM}, p_i^{UBM})]$$

where the index i runs through the mixture components in the model $M^{UBM}$, $*_i$ is the maximizing index, and p(i) is a multivariate Gaussian density. Extending to the entire test data, gives (equation no. 2):

$$d(X \mid M^j) = \frac{1}{N_{test}} \sum_{t=1}^{N_{test}} d(x_t \mid M^j)$$

When used for verification, the result is compared to a threshold. For identification, the function is computed for all speakers "j" to find the maximizing speaker score. We motivate the use of a filter as a computationally significant mechanism to control resource usage by noting that the above computation is required for each frame analyzed. There is an additional final score sorting cost for identification, but for practical purposes, the number of frames will vastly outnumber the speakers, maintaining the significance of frame reduction.

Filtering Data

The sequence of test data frames is denoted by $\{x_t\}$, t=1 ... $N_{test}$. Each element of the sequence has a label, such that labels and frames are in one to one correspondence. The labeling is assumed to produce for each frame, and element 1 from an alphabet of labels L. Thus, $X'=\{(x_t,l_t)\}$, t=1 ... $N_{test}$.

The speaker models are represented by the set $M=\{M_j\}$. Let $\{x^j_{dev}\}$ be development data for model $M_j$ and $\{x_{dev}\}$ be their union over j. Define $F_{SI}=\{l_k\}$, k=1 ... $N^L_{SI}$ (SI is speaker independent) to be the set of labels defining the filter independent of the speaker being detected. $N^L_{SI}$ is the total number of labels in the filter. Let $\{X_{dev},l\}$ be the subset of the development data labeled l. Then:

$$l_1 = \arg\max_{l_j \in L} \text{perf}(\{x_{dev,l_j}\}),$$

(perf is the performance measure of interest) For the speaker independent filter, this measure is the aggregate identification rate computed over all target models using the development data. The particular experiment used for optimization is a closed set identification task among all target speakers. Continuing, $$l_n = \arg\max_{l_j \in L - \{l_1 \ldots l_{n-1}\}} \text{perf}(\{x_{dev,l_j}\}).$$

Similarly, $F_j=\{l_k\}$, k=1 ... $N^L_j$ which is the set of labels defining the filter for speaker j, defined as above with $\{x^j_{dev,l}\}$ replacing $\{x_{dev,l_j}\}$ (i.e. use data only from speaker j and label $l_j$) and the individual identification rate of speaker j replacing the aggregate rate for the performance measure.

The discriminant with speaker independent filtering becomes (equation 3):

$$d(X \mid M^j) = \frac{1}{\sum_{i=1}^{N_{test}} I(x_i \in F_{SI})} \sum_{t=1}^{N_{test}} I(x_t \in F_{SI}) d(x_t \mid M^j)$$

and with speaker dependent filtering (equation 4):

$$d(X \mid M^j) = \frac{1}{\sum_{i=1}^{N_{test}} I(x_i \in F_j)} \sum_{t=1}^{N_{test}} I(x_t \in F_j) d(x_t \mid M^j)$$

where I(.) is an indicator function of the validity of its argument, taken to mean that the vector's label is passed by the filter.

Thus target models are associated with an optimal set of labels with respect to recognition performance. In cases where the identity of the speaker sought is known, the data in the system can be filtered to pass only the optimal labels, $F_{j4}$ for that speaker. Alternatively, if there is a set of speakers of interest, say the enrolled population, then an aggregate best list of labels, $Fs_1$, can be chosen. Silence removal, a common practice, would be a degenerate form of this type of filtering.

TABLE 1

Identification performance for various filtering configurations.

| | phone rank | | |
|---|---|---|---|
| | 1 | 2 | 3 |
| Name | N | IH | T |
| % data | 6.21 | 5.74 | 5.69 |
| % accuracy | 72.62 | 68.67 | 64.42 |
| top 2% accuracy | | 82.43 | |
| top 3% accuracy | | | 85.21 |

EXAMPLES

Setup

The data consisted of the audio portion of broadcast news database. A subset of sixty four speakers were selected as the target speakers. The waveforms were mono 16 kHz PCM (Pulse-code modulation). The analysis configuration was 19 dimensional MFCC+1st derivative (38 dim vector) with feature warping. A rate of 100 frames per second, with 50% overlap was used and the MFCC (Mel Frequency Cepstral Coefficients) were computed over a 20 millisecond window. For each speaker, two minutes of data were set aside and used for training the final models. The remaining data was partitioned according to various criteria and used for testing. No labeled data was used in training. There were 683 testing cells, ranging from 306 to 2034 frames (3.06 to 20.34 seconds).

Label Ranking

The data was labeled with an HMM (Hidden Markov Model) based ASR (Automatic Speech Recognition) system that generated alignments to available transcripts. As such, the labels are relatively high in quality. A set of 41 phonetic units were used: S TS UW T N K Y Z AO AY SH W NG EY B CH OY AX JH D G UH F V ER AA IH M DH L AH P OW AW HH AE TH R IY EH ZH.

The first example details the per phone based recognition performance based on the above labels using the 38 dimensional MFCC based features. The final speaker models did not use any label information. Table 1 summarizes the identification performance for filtering configurations based on phonesets determined by aggregate performance, i.e. based on the top labels in $F_{S1}$. Using all of the data, the overall identification performance was 92.53% correct. A further breakdown of the results shows, for the top three phones individually, the results were: 72.62% for "N", 68.67% for "IH", and 64.42% for "T" representing respectively, 6.21, 5.74, and 5.69 percent of the total data. The top phones were determined based on ranking of aggregate performance on all speakers. Scoring data from the top 2 phones combined, results in 82.43% accuracy on 11.96 percent of the data. The top 3 phones together give 85.21% on 17.65 percent of the data.

Detection

In the case of speaker detection, the results can be broken down with respect to speaker independent (aggregate best) phonesets and speaker dependent phonesets, which were determined as those for which the recognition rates were individually maximized. The equal error rate for the baseline case where all of the data is used is 4.39%.

Speaker Independent Filtering

The examples above indicate the amount of throughput increase that can be achieved by implementing the present invention. Consider the verification performance for 5 phonesets, ranging from the set with only the top performing (aggregate best) phone, to the set with the top phones. Each of these sets represents a data filter, and the amount of data passing the filter naturally increases with the number of elements in the set. The performance improves as well. Filtering based on the top phone leaves 6.21% of the data with a corresponding equal error rate (EER) of 10.25%. Top 2 phones=11.96% data corresponding to 7.24% FER. Top 3=17.65% data−>6.84% EER. Top 4=21.80% data−>6.16% EER. Filtering based on the top 5 phones leaves 31.91% with an EER Of 6.35%. We point out, that for the speaker independent case, the performance of the top 4 is better than that of the top 5. However, as will be seen in the next experiments, the top five set does indeed perform better then the top four set for the speaker dependent filters.

Speaker Dependent Filtering

In the case of a detection problem, of which verification is an example, the amount of data can be farther reduced and performance improved by tailoring the filters to the entity or object being detected, in the present case a speaker. In this case, filtering based on the top phone, which depends on the speaker, passes only 5.7% of the data resulting in an EER of 8.24%, top 2=10.84% data−>6.78% EER, top 3=15.55% data−>6.03% EER, top 4=20.11% data−>5.93% EER, while the top 5 phones select 24.20% of the data for an EER of 5.45%. By having speaker dependent filters (in general, filters tailored to the entity being detected), less data is passed through the filters and better performance is achieved, as compared to the speaker independent case. For the present configuration, a throughput increase of 400% can be achieved with a 1% increase in EER, as compared to the all data case.

Thus, a method is presented which reduces data flow and thereby increases processing capacity, while preserving a high level of accuracy in a distributed speech processing environment. The method of the present invention includes filtering out (dropping) data frames based on a target speaker specific subset of labels using data filters which results show, preserves accuracy, and passes only a fraction of the data by optimizing target (specific) performance measures. Therefore, a high level of speaker recognition accuracy is maintained while utilizing existing processing capabilities, and eliminating the need to increase processing capabilities to analyze all data without the use of the method of the present invention.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A method for reducing the amount of speech data for detecting desired speakers, comprising:

receiving a plurality of speech data from a plurality of speakers using a computer program stored on a computer;

labeling the speech data using the computer program;

priority ranking the labeled speech data using a speaker dependent filter for each of the speakers using the computer program;

generating the priority ranking by prioritizing the labeled speech data according to a performance criterion for each of the plurality of speakers using the computer program;

analyzing the labeled speech data according to the priority ranking of the labeled speech data for a specific speaker;

filtering out specified lower priority labeled speech data such that less of the speech data is analyzed; and adjusting the step of filtering out specified lower priority labeled speech data to attain a specified speech data throughput.

2. The method of claim 1, wherein the speakers are divided into groups of speakers and the filters are generated and used for each group of speakers.

3. The method of claim 2, wherein the labels for the groups of speakers are priority ranked.

4. The method of claim 1, wherein the data is pre-labeled.

5. The method of claim 1, further comprising:

creating a group of filtered speech data for recognition analysis using the speaker dependent filter, and the group of filtered speech data being smaller than the plurality of speech data; and analyzing the filtered group of speech data for recognition.

6. A speaker recognition system using a computer, which comprises:

a plurality of speech data from a plurality of speakers stored on a computer;

a labeler element for analyzing the speech data and labeling the data;

a speech data filter including a filter element for arranging the labels in a priority rank and the speech data filter designed according to a performance criterion for each of the plurality of speakers;

a recognition element for analyzing the labeled data in accordance with the priority rank as determined by the speech data filter for filtering out specified lower priority labeled speech data to reduce speech data analyzed; and a specified speech data throughput being attained by filtering out specified lower priority labeled speech data.

7. The system of claim 6, wherein the labels are phonetic.

8. A computer program product comprising a computer having a computer program, the computer executing the steps of the computer program for reducing the amount of speech data when detecting desired speakers, the program steps comprising:

receiving a plurality of speech data from a plurality of speakers using the computer program stored on the computer;

labeling the speech data using the computer;

priority ranking the labeled speech data using a speaker dependent filter for each of the speakers using the computer;

generating the priority ranking by prioritizing the labeled speech data according to a performance criterion for each of the plurality of speakers using the computer;

analyzing the labeled speech data according to the priority ranking of the labeled speech data for a specific speaker;

filtering out specified lower priority labeled speech data such that less of the speech data is analyzed; and adjusting the step of filtering out specified lower priority labeled speech data to attain a specified speech data throughput.

* * * * *